Dec. 28, 1965  A. HETTICH ETAL  3,226,206
EXHAUST GAS SYSTEM
Filed June 26, 1962  7 Sheets-Sheet 1

Inventors
ALFRED HETTICH, SIEGFRIED KOFINK
HERBERT MARTIN
BY
McGlew and Toren
ATTORNEYS.

Inventors
ALFRED HETTICH, SIEGFRIED KOFINK
HERBERT MARTIN
BY
McGlew and Toren
ATTORNEYS.

Dec. 28, 1965  A. HETTICH ETAL  3,226,206
EXHAUST GAS SYSTEM

Filed June 26, 1962  7 Sheets-Sheet 4

Inventors
ALFRED HETTICH, SIEGFRIED KOFINK
           HERBERT MARTIN
BY
ATTORNEYS.

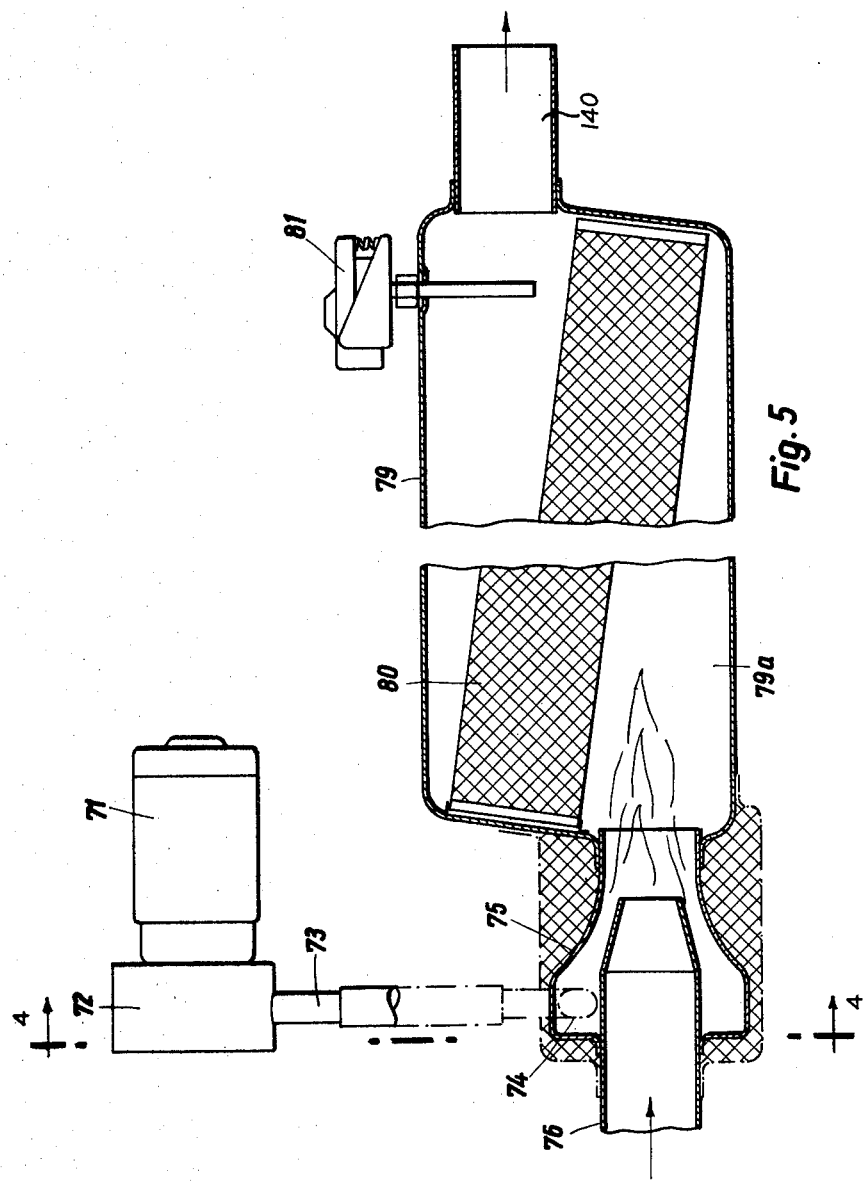

Inventors
ALFRED HETTICH, SIEGFRIED KOFINK
HERBERT MARTIN
BY
McGlew and Toren
ATTORNEYS.

Dec. 28, 1965   A. HETTICH ETAL   3,226,206
EXHAUST GAS SYSTEM
Filed June 26, 1962   7 Sheets-Sheet 7

INVENTOR
ALFRED HETTICH,
SIEGRIED KOFINK,
HERBERT MARTIN
BY
ATTORNEYS

United States Patent Office 3,226,206
Patented Dec. 28, 1965

3,226,206
EXHAUST GAS SYSTEM
Alfred Hettich, Esslingen (Neckar), Siegfried Kofink, Zell (Neckar), and Herbert Martin, Esslingen (Neckar), Germany, assignors to J. Eberspacher, Esslingen (Neckar), Germany, a German firm
Filed June 26, 1962, Ser. No. 205,453
Claims priority, application Germany, June 28, 1961, E 21,303
10 Claims. (Cl. 23—288)

This invention relates in general to internal combustion engine exhaust gas systems and in particular to a new and useful device for decontaminating exhaust gases and to a combination space heater and decontamination device.

The invention particularly relates to the decontamination of exhaust gases in conjunction with so-called oxycatalysts which operate upon the components of the waste or exhaust gases to insure complete oxidation or burning of the deleterious gases such as poisonous carbon monoxide. Usually, decontaminators for exhaust gases of a catalytic type consist of a catalytic carrier, for example, a porous material which is charged with a substance for releasing or causing catalytic reactions, for example, metal oxide. The catalyst substance or the catalyst carrier and the catalyst proper is usually in a grain form which is filled into containers, the walls of which are perforated. Such containers are disposed in the exhaust gas line or flow path of the exhaust gases and insure that the components of waste gases which have not been completely consumed or burned, for example, carbon monoxide gases, are oxidized in the presence of the catalyst to form carbon dioxide. For this purpose, a sufficient amount of oxygen has to be supplied. In addition, in most instances, heat energy has to be supplied unless the catalyst has been brought to its active temperature by the waste gases which are flowing therethrough. When the catalytic action starts, considerable amounts of heat are liberated in dependence upon the amount of unconsumed components in the waste gases which are oxidized.

With prior art devices, it was difficult to maintain the temperature of the catalyst or of the space surrounding the catalyst within limits at which catalytic action takes place, and also within a limit in which destruction of the containers or the catalysts does not also take place. Where attempts have been made to provide cooling of the catalytic container, no means have been provided to insure that a minimum temperature is maintained at all times to insure initiation of the catalytic reaction. Since the catalysts are only active upon a predetermined temperature, there are many conditions of operation, particularly in cold weather, when the catalysts do not become active because they are not brought to the required reaction temperature. The exhaust gas temperatures of an automotive engine, during starting and idling of a motor car, for example, are usually below the operating temperature which is required for the catalysts to become active and to initiate the carbon monoxide combustion. Further, it is just during these operating conditions, that is, during starting and idling, that the largest amount of carbon monoxide is formed. This means that the exhaust gases are not decontaminated during operating conditions at which decontamination is most desirable, that is, during starting in a garage and during stop-and-go driving in a city. When a combustion engine does operate at full load and/or speed, the temperatures of the gases are usually so high that the stability of the catalyst is seriously impaired.

In accordance with the invention, means are provided to adjust the catalyst temperature particularly for the decontamination of waste gases of internal combustion engines such as automotive vehicles in such a manner that the temperature of the gases in the vicinity of the catalyst will always be between proper range limits to insure that the catalyst is maintained in a temperature range where it is active and also in which it is secured against overheating. In accordance with the invention, catalysts are arranged in the exhaust gas stream and are associated with a space heating and ventilating device which is controllable and responsive in dependence on the catalyst temperature. The heating and ventilating device advantageously supplies oxygen air for the catalyst and in dependence on the operating temperature of the catalyst, supplies cooling air for heating gas produced from a burner in the unit.

In accordance with one feature of the invention, the adjustment of amounts of hot or cold air which are conveyed to the catalyst and the regulation of the generation of the hot air by a burner unit is accomplished by means of thermostatic control means located in the vicinity of the catalyst to maintain the catalyst within a temperature range for preferred operation thereof. The thermostats are advantageously arranged to provide for operation within maximum and minimum temperature limits and the operation of the heater and ventilator is controlled by the thermostat to maintain such limits.

In the preferred arrangement of the invention, the heating and ventilating device advantageously includes a separate air feeding means operated by a blower which is advantageously driven by the internal combustion engine which generates the exhaust gases but which may be operated independently from the combustion engine, if desired. The invention is advantageously carried out by use of a heating device for the passenger space or cabin which is operated during the heating cycle by burning liquid fuel, such as ordinary motor car gas. The preferred arrangement includes means for atomizing the fuel by directing it against a rotating member in a combustion air stream which is sucked by a blower and then igniting the fuel and air mixture and directing it in heat exchange relationship through a heat exchanger having means for circulating the heating air therethrough. A device of this nature may be operated as a ventilating device by merely securing the burners during the operation of the blower and thus the air which is circulated by the blower may advantageously be used as oxidation air for the catalyst or as a temperature control to either decrease or increase the temperature surrounding the catalyst. The heating or cooling effect is also advantageously adjusted in accordance with the speed of the driving motor or motors which advantageously are separate electric motors which may be operated independently of the internal combustion engine.

The invention also considers in the application of the inventive principle the use of a resonant burner wherein the fuel and the combustion air are automatically sucked and compressed by the pulsating gas column in the burner. A resonant burner device is particularly suitable wherein the burner tube is centrally arranged in a cylindrical jacket casing while the ends of the burner tubes charge a guiding means which supplies waste gas flow into a radial turbine which subsequently is charged from the inside. The radial turbine in turn drives a blower or other air conveying means.

The invention also contemplates a combination of a waste gas turbine as a driving means with a heating device having rotating parts. A combination of this type would include means for adjusting the oxidation air feeding and cooling and heating effects on the catalyst which is disposed in the waste gas flow path.

In accordance with another arrangement of the invention, the catalyst reaction heat can be utilized in addition to the burner and exhaust gas heat for space heating purposes. Generally, it has been found that the device may be operated to arrange one of the air conveying devices of the invention so that the oxidation air for the catalyst may be constantly switched on or off, and the combustion air necessary for the heating of the catalyst or the cooling air necessary therefor may be intermittently directed to or away from the catalyst as necessary, depending on the temperature of the operation thereof. Thus, in one arrangement, the exhaust line is provided with a nozzle and venturi section for permitting combining of either cooling or heating gases with the exhaust gases which are directed over the catalyst. Thermostatic controls located at the catalyst effect the operation of the heater and the combining of the heating gases when the temperature falls below a certain value or securing of the heater and combining of cooling gases when the temperature rises above a certain value.

When the exhaust gas pipe or line is arranged with an ejector having a nozzle and venturi section for the flow of the exhaust gases, it is advantageous to insure that the line is such that a suctional opening is maintained in the region of an acoustic pressure for the area of the exhaust pipe line at which the maximum local sound pressure is situated and where there may occur, for example, first, second and third flow harmonics. In this manner, without having excessive volumes, the very disturbing resonant frequencies can be eliminated, and sound damping devices need not be employed. Various flow diffusing arrangements are possible in accordance with the invention to insure proper temperature exhaust gas flow in the vicinity of the catalyst.

It has been found that it is preferable when the device is employed with a motor vehicle or automobile to provide means in the starting circuit of the vehicle to keep the starting circuit open by means if delay switches, relays and the like for a period sufficient to permit the decontamination device to be brought up to active operating temperatures.

When the heating unit is employed with the catalyst, and an open flame of the heating is directed along the exhaust gas line, the combustion of the exhaust gases produced by the catalyst is surprisingly increased and this occurs under those conditions of operation under which the most carbon monoxide is produced. This advantageous condition is effected when the heating element is arranged so that the gases generated during the heating cycle flow directly into the exhaust gases.

Accordingly, it is an object of this invention to provide an improved means for decontaminating exhaust gases.

A further object of the invention is to provide an improved space heater operating in conjunction with waste heat gas systems.

A further object of the invention is to provide a combination exhaust gas decontaminator and space heater.

A further object of the invention is to provide a space heater and an exhaust gas decontaminator which includes catalysts arranged in the exhaust gas flow for effecting further oxidation of the exhaust gases, including a heater element, having means for effecting separate combustion, connected to discharge the gases of combustion to the exhaust gas line when the temperatures of the exhaust gases are not sufficient to maintain the catalysts at an operating condition, and which further includes means for directing cooling air into the exhaust gas line and in the vicinity of the catalysts, when the catalysts are of temperatures high enough to have deleterious effects on the catalysts or containers therefor.

A further object of the invention is to provide an exhaust system for operation in the exhaust line of an internal combustion engine which includes a space heating and ventilating unit having air circulating and separate heating means arranged in the vicinity of the exhaust line and operable to selectively direct heating gases or cooling gases through the exhaust line in the vicinity of the catalyst, and which further includes means for utilizing the heat generated by the oxidation reaction of the catalyst for effecting space heating.

A further object of the invention is to provide a decontaminator for exhaust and similar waste gases of an internal combustion engine and the like which includes means for selectively heating or cooling the vicinity of the catalyst in order to insure that the exhaust gases passing therethrough maintain the catalyst in a proper operating temperature range.

A further object of the invention is to provide an improved automobile space heater and ventilator which includes casing means surrounding an exhaust gas line of the internal combustion engine and which carries catalyst means for effecting the further oxidation of the gases and the liberation of heat and which includes means for combining the liberated heat with independently generated heat of the heating unit for space heating purposes.

A further object of the invention is to provide a combination space heating and ventilating unit and exhaust gas catalyst decontaminator including a casing for the catalyst disposed in the exhaust gas flow line over which heating air is directed for transmission for space heating purposes and including means for separately generating heating gases which are directed in heat exchange relationship with further heating air for space heating purposes and a control arrangement for insuring that heating gases or cooling air is selectively directed to the space surrounding the catalysts in order to maintain them at a proper operating temperature range.

A further object of the invention is to provide a space heater and ventilator and also an exhaust gas decontaminator which is simple in design, rugged in construction and economical to manufacture.

The various features of novelty which characterize the invention are pointed out with particularity in the claims annexed to and forming a part of this specification. For a better understanding the invention, its operating advantages and specific objects attained by its use, reference should be had to the accompanying drawings and descriptive matter in which there are illustrated and described preferred embodiments of the invention.

In the drawings:

FIG. 5 is a transverse section taken on the line 5—5 of FIG. 4;

Figure 1:
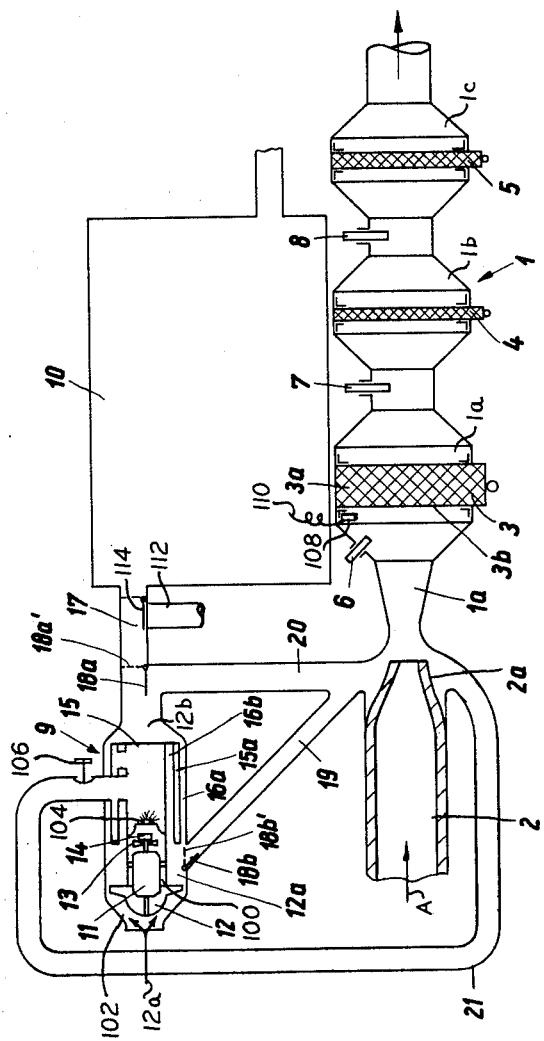
FIG. 1 is a schematic representation of an exhaust gas pipe line for an internal combustion engine and an oxy-catalyst system for decontaminating the exhaust gases operating in conjunction with a space heater and ventilator construction in accordance with the invention.

Referring to the drawings in particular, the invention embodied therein in FIG. 1 includes a decontaminator assembly generally designated 1 which is arranged as a a section of an exhaust line 2. The exhaust line 2 is connected to receive exhaust gases from an internal combustion engine (not shown). Exhaust gases are directed in the direction of the arrow indicated by the letter A and they are discharged through a nozzle section 2a formed in the exhaust line, into a venturi 1a which opens to a conduit system generally designated 1 having the catalyst.

The decontaminator conduit system 1 includes sections 1a, 1b and 1c of larger diameter which carry catalyst units or assemblies 3, 4 and 5 which are disposed directly across the path of the exhaust gas flow, so that the exhaust gases pass through the catalyst assembly. Pressure switch 6 is located in front of the catalyst assembly 3 and pressure switches 7 and 8 are loacted between assemblies 3 and 4 and 4 and 5, respectively. The switches 6, 7 and 8 include elements which are exposed to the pressure in the sections 1a, 1b and 1c to signal when solid contaminants form on the catalyst in a sufficient amount to cause an increase in pressure which may prevent effective operation thereof.

Generally speaking, the temperatures of the exhaust gases, which exit from the nozzle 2a and which are generated by the internal combustion engine, between idling or full speed range are from about 150° to 650° C. The temperatures of the catalyst assemblies 3, 4 and 5 will correspond, with slight variations, to such temperatures, and will also be subjected in addition to reaction heat liberated during the oxidation of carbon monoxide, and combustion heat is generated by this process.

In accordance with the invention means are provided to insure that the temperature of the catalyst assembly units 3, 4, 5 as controlled by the temperature of the exhaust gases discharged into the venturi section 1a is adjusted so that a temperature of at least 250° C. is maintained to insure the initiating of the carbon monoxide combustion in the catalyst assembly 3 regardless of the operating conditions of the internal combustion engine. In addition, the gases discharged into the venturi 1a are also maintained at a temperature to insure that no overheating will occur which will destroy any of the catalyst assemblies.

In accordance with the invention, in one embodiment this is effected by means of a heating and ventilating device generally designated 9 which is advantageously a device for heating a schematically indicated interior space 10 of a motor car. The device 9 comprises an electric motor 11 mounted in an inner casing 100 concentrically arranged within a tubular casing element 102 and which rotates blower 12 to circulate combustion air and heating air in the direction of arrows 12a and to also drive a combustion air fan 13 to direct the combustion air over a rotating element 14 against which fuel is sprayed by means (not shown) to cause atomization thereof. The fuel is then ignited by an ignition device 104 and the gaseous products of combustion form in the combustion space 15 which includes an annular extension portion 15a. The combustion space 15 leads to a conduit 21 having a control valve 106 therein for insuring proper flame control and preventing suction effect in a manner to be disclosed hereinafter.

Air which is drawn in through the opening 12a is directed in heat exchange relationship with the combustion space 15 and surrounding chamber 15a and directed out through an opening 12b passing first through the channels 16a and 16b. From the line 12b the air may flow either into a conduit 17 leading to the compartment space 10 of the automobile, or into a conduit 20 connected to the venturi section of the ejector 1a for flow with the exhaust gases exiting from the exhaust conduit 2. In order to control the amount of air which flows either into the compartment 10 or down the conduit 20, there is provided a control flap 18a which may be moved from the position 18a to the dotted line position 18a' for air circulation control purposes. In the dotted line position none of the air is circulated into the automobile compartment space 10, but all of it is circulated down through the conduit 20. In the solid line position some of the air is circulated into the compartment 10 and a small portion is also circulated through the conduit 20.

The line 19 extends from the forward end of the outer casing 102 to the exhaust conduit 2 at the location of the juncture of this conduit with the conduit 20 and at the location of the venturi portion of the nozzle ejector. A flap control valve 18b may be moved from the solid line position at which it fully opens the conduit 19, to the dotted line position in which the conduit 19 is fully closed and no cooling air is submitted therethrough. Thus the conduit 19 may supply very cool air to the discharge of the exhaust gases and the conduit 20 supply a slightly heated air, in each case the air containing a large percentage of oxygen to aid in the catalytic process. Conduit 21 is also connected to the discharge of the exhaust conduit 2 and will discharge combustion gases from the chamber 15 into the nozzle portion 1a by the suction action of the nozzle whenever valve 106 is opened and the burner is in operation. When the exhaust gases pass through the conduit 2 and are discharged into the nozzle section 1a, a vacuum pressure condition is produced in the throat section to aid in the flow of the gases through conduit 19, 20 and 21, depending on which is opened thereto. In this manner the exhaust gases may be admixed with cool fresh air together with oxidation air from the conduits 19 and 20. By properly regulating the control flaps 18a and 18b it is possible to regulate the amount of oxidation air and cooling air which is supplied at this location and which affects the temperature of the catalysts 3, 4 and 5. A thermostat 108 is located in the vicinity of the catalyst 3 and is connected preferably through an electrical conduit and circuit 110 to the flaps 18a and 18b in order to actuate them in accordance with the temperature conditions at the catalyst.

In those instances where the catalyst assembly at the location of the thermostat 108 is to be preheated or brought up to a higher operating temperature, the flap 18b will be entirely closed and the flap 18a will be opened only to an extent to permit air flow through the line 20 sufficient for oxidation purposes. At the same time the burner of the heating device is ignited by the action of the control circuit 110 and the heating gases are supplied via the line 21 to the decontaminator 1. In the embodiment illustrated the heating device 9 is located directly adjacent the exhaust pipe 2 and hence the flame from the heating gases is blown directly to the hot gas line 20 into the exhaust gas flow so that an open flame combustion of the poisonous components of the exhaust gas exiting from the conduit 2 is effected.

During summer the hot air discharged through the conduit 17 is directed through a blower conduit line 112 by arranging a valve 114 in a dotted line position preventing flow into the compartment space 10. The valve 114 may be advantageously regulated manually or automatically to prevent ventilation of the compartment space 10 in those instances where the heater is not operated during the summer.

Figure 2:
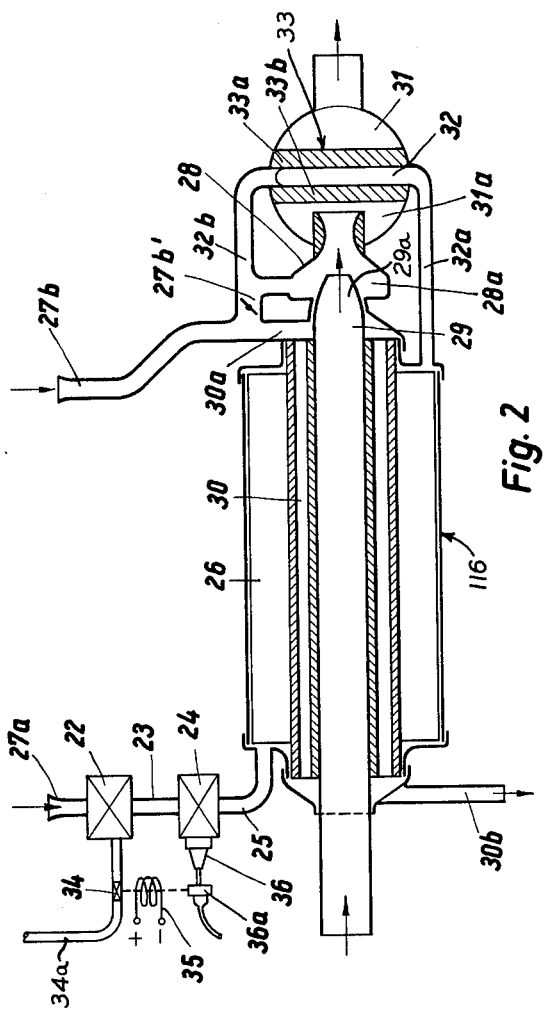
FIG. 2 is a schematic transverse section of another embodiment of the invention including an exhaust gas line having a combination exhaust gas heater and decontaminator.

A similar device is indicated in FIG. 2 which includes a heat exchanger section generally designated 116 arranged directly over an exhaust pipe 29a which has a constricted end arranged to discharge into an ejector nozzle 28 which in turn has a discharge which is directed against a catalyst assembly generally designated 33.

The heat exchange section 116 includes a space heating chamber 30 defined by first annular casing walls which surround the exhaust pipe 29 and which includes an inlet connected to an air supply conduit 27b through a passage 30a and a discharge which is directed into the space requiring heating by conduit 30b. Surrounding the space heating chamber is a combustion air chamber 26 defined by an annular casing exteriorly of the space heating chamber. Fuel is directed through a conduit 34a which contains a fuel valve 34 regulated by means of a magnetic valve or solenoid schematically indicated at 35 which also regulates a switch 36a for an igniter 36 of the burner 24. Fuel which is delivered through the conduit 34a when the valve 34 is opened mixes with air supplied to a conduit 27a in a mixture preparing device 22 and is then directed through conduit 23 to the burner 24 and discharged through conduit 25 into the annular heating chamber 26.

The catalyst assembly 33 includes a decontaminating chamber 31 in which are mounted catalyst elements 33a and 33b which are positioned to intercept the exhaust gas flow path. In the longitudinal dimension of the decontaminator 31 there is arranged a helical heating coil 32 which coil by means of line 32a is connected to the annular heating space 26 on one end. The coil 32 is connected at its opposite end by line 32b with the suction space 28a of the ejector 28. The heating coil 32 in accordance with the invention has a holding means for the catalyst assemblies 33a and 33b which are provided on both sides as a coating of the coil. The catalyst assembly 33 is constantly supplied with air necessary for oxidizing the exhaust gases flowing into the chamber 31a through the line 27b' which is branched off from the air supply line 27b. When the fuel valve 34 is closed, air which is injected in the mixing preparing device 22 passes through the line 23, the burner 24, the hot gas line 25, and the heating space 26 to the line 32a and into the heating or cooling coil 32 where this coil cools the catalysts 33a and 33b. At such a time as the solenoid control 35 besides keeping the fuel valve 34 closed also opens the switch 36a of the spark plug 36. When switching is reversed for heating the valve control 35 opens the fuel supply valve 34 and closes switch 36a, and the fuel air mixture which has been prepared in the mixing device 22 is ignited in the burner 24. The heating gas which is generated is directed to the annular heating space 30 and in heat transfer relationship to the heating air which is also guided through the chamber 30. The gases pass through the coil 32 via conduit 32a to heat the catalysts 33a and 33b. In some instances it is preferable to have a heating coil 32 with fine bores or perforations, so that cooling air or hot gases come into contact with the catalyst substance along the entire dimension of the catalyst.

Figure 3:
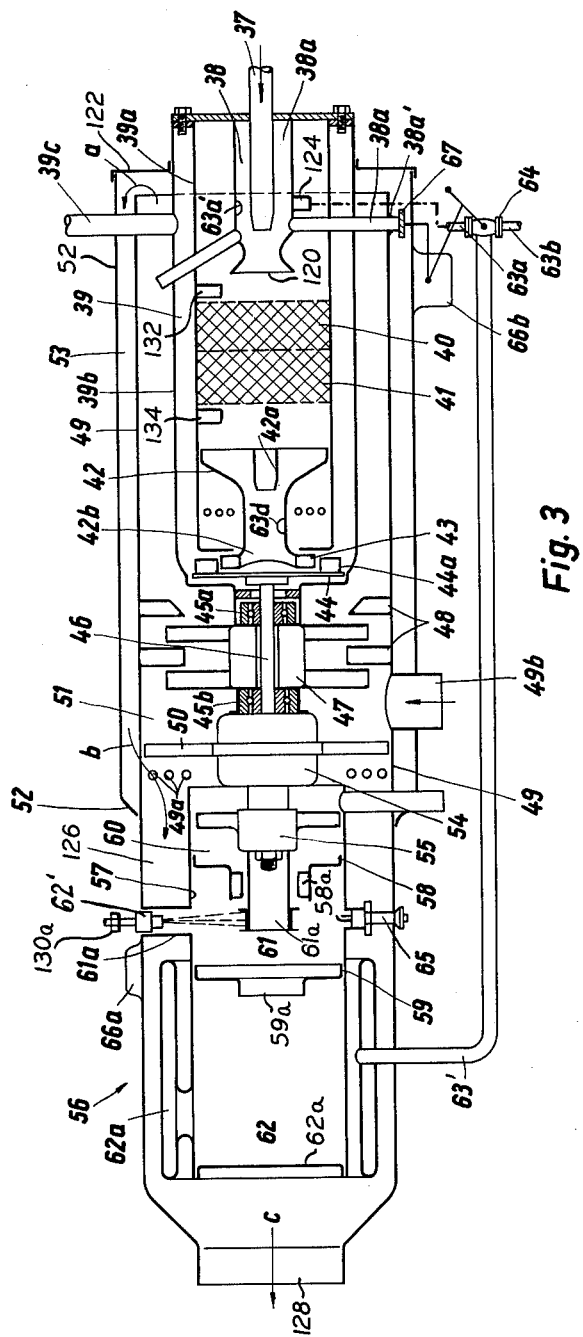
FIG. 3 is a transverse section of another embodiment of the invention including a combination space heater and ventilator and exhaust gas decontaminator.

In FIG. 3 a space saving unit combination decontaminator plant and heating-ventilating device is provided for securement directly to the exhaust line 37 from an internal combustion engine (not shown). The exhaust line 37 is shaped in a nozzle or constricted area form at its end and projects into an injector casing 38a which is held at one end of an inner casing 39 which has an outer annular wall defined by an interior casing wall 39a. In the interior of the wall 39a there is provided a catalyst 40 and 41 arranged to receive exhaust gases discharged through the discharge 120 of the ejector 38. The catalytic filter layer 40 is sensitive to temperature and a particular temperature range of operation is maintained.

At the opposite end of the casing 39 an inlet 42 with a central opening 42a is provided which has an opening 42b on its opposite side arranged to discharge radially outwardly through deflection vanes 43 which deflect the gases against rotating vanes 44a of a turbine 44. The turbine 44 includes a shaft 46 which is supported on spaced bearings 45a and 45b and which carries a two stage blower 47. Stationary guide means 48 are provided as inward projections of an outer cylindrical casing or jacket 49. The jacket 49 is closed at one end by wall 50 and at an opposite end by a wall 122 which defines an opening through which gases discharge as indicated by arrow "a" into an annular space 49 defined by walls 29 and an outer wall 52.

An electric motor 54 is held in the wall 50 and rotates the shaft 46. On the opposite side in the wall 50 there is arranged within the casing 49 a heating device generally designated 56 which is operated by means of the combustion air blower 55 rotatively mounted on the opposite extension of the shaft 46.

The heating device 56 comprises an inner cylindrical container 57 closed at the end adjacent the wall 50 and provided with inner division walls 58 and 59 the former having a deflector 58a for the flow of combustion air, the latter defining a central opening 59a for the flow of gaseous products of combustion into a combustion chamber 62 which is closed by wall 62a at its outer end. Walls 58 and 59 divide the interior space into a pressure space 60 at the location of blower 55, a combustion chamber 61 at the location of a rotating atomizing device 61a, and an after-combustion space 62 carrying a plurality of annular heat exchange rings 62a with communicating passages through which heating air is directed.

An exhaust line 63 connects the after-combustion chamber 62 and leads to a control valve 64 for admission through a conduit 124 to the ejector 38 or to a conduit 63b for venting.

The annular space 126 between the container wall 57 and the casing jacket 49 is connected with the annular space 53 by means of perforations 49a in the wall of the casing jacket 49. Air which is circulated by the turbine or blower 47 is directed in the direction of the arrows a through the annular space 53 and into the perforations 49a to the space 126 which communicates with a discharge 128 for directing the heating air in the direction of the arrow c for space heating purposes.

An atomizing nozzle 62' is arranged in the lateral chamber 61a of the combustion chamber 61 and fuel is injected during operation in a fine jet and evaporated on the surface of a rotating atomizing drum 61a which is rotatable with the shaft 46. The atomizing causes fine mixing with the combustion air which is fed from the pressure space 60 through deflecting vanes in a whirling direction and the mixture is ignited by spark plugs 65. Gaseous products of combustion which are generated are directed into the after-combustion chamber 62 and thus to the annular extension 62a and discharged through the pipe 63'.

The electric motor 54 is operated in accordance with operating requirements for maintaining the catalysts 40 and 41 at the desired temperature. For this purpose control means are provided which are operable in accordance with temperatures sensed in the vicinity of the catalysts to control the operation of the motor and the fuel and ignition system of the heater 56. Such control means include the magnetic control valve or solenoid valve 66a, provided on the outside of the casing jacket 49, and a similar control mechanism 66b provided at the opposite end for sensing the temperatures of the exhaust gases at the location of the ejector 38. The electrical connections are such that the heater is started and the gaseous products of combustion are connected through conduit 63 and conduit 124 to the ejector 38 when the catalysts 40 and 41 are subjected to low temperatures which would not permit their effective operation. In the same manner when the temperatures are excessive, cooling air is directed into the ejector 38 when the temperature at such location is excessive.

The electric motor 54 is connected to a current supply (not shown) so that it is immediately supplied with current when the igniting circuit is switched in. At the same time the igniting current interrupter which operates from the electromotor 54 is connected to the spark plug 65. When the electromotor 54 starts up, the exciter circuit of the solenoid valve 66a is closed by means of a switching element (not shown) and the valve 30a of the fuel nozzle 130 is opened. The control valve 64 is also operated by the control solenoid 66b at the same time to position the valve so that the discharge 63 is connected through a conduit 124 to the ejector 38.

The exhaust gases transferred during the passage to the catalyst assemblies 40 and 41 a portion of their heat to the catalyst assemblies. During operation of the electromotor 54 the turbine 44 sucks the exhaust gases which pass through the catalyts 40 and 41 and conveys these gases into the annular space 39 and discharges them into the discharge pipe 39c to the outside or to a subsequently arranged sound damping member (not shown). The turbine or blower 47 thus helps to accelerate the relatively slowly flowing gases and helps overcome the flow resistance which is increased by the catalyst assemblies 40 and 41.

During winter operation the fresh air sucked through an inlet pipe 49b which communicates with the pressure chamber 51 is used for heating selected areas, for example a passenger cabin. For this purpose air is first supplied to the pressure space 51 when the exhaust gases transfer their heat thereto, thereafter the fresh air flows through the annular outer space 53 and the openings 49a and the casing jacket 49 into the annular space 64 of the heating device. The air is further heated by the combustion in the combustion chamber 62 and directed to the discharge 128 to the heating area.

During summer and cooling operation the switching is accomplished by means of maximum and minimum temperature thermostats which are associated with the catalyst assemblies 40 and 41 and designated 132 and 134, respectively. The thermostats 132 and 134 are connected to the solenoid 66a to maintain the valve 62 closed. When the maximum temperature has been exceeded, the solenoid 66b is excited and thereby the valve body 67 is lifted from the valve seat 38a of the ejector which ventilates the line 38a. The air which is under pressure in the annular space 53 flows into the ejector suction space 38a where it is mixed with the exhaust gases flowing from the exhaust line 37 and thus cools these gases. The switching is such that upon operation of the combustion engine the electromotor 54 is switched off so that the turbine 44 alone will drive the air blower 47.

Upon reversal for cooling, the exhaust line 53 is connected with the inlet member 42 via the line 63d and this applies for both summer and winter operation. The member 42 at the narrowest part is constructed as an ejector in order to produce a suction on line 63d and only with the help of this device is it possible in accordance with the invention to introduce burner waste gases which have a lower pressure than combustion machine waste gases into the total exhaust gas flow.

Figure 4:
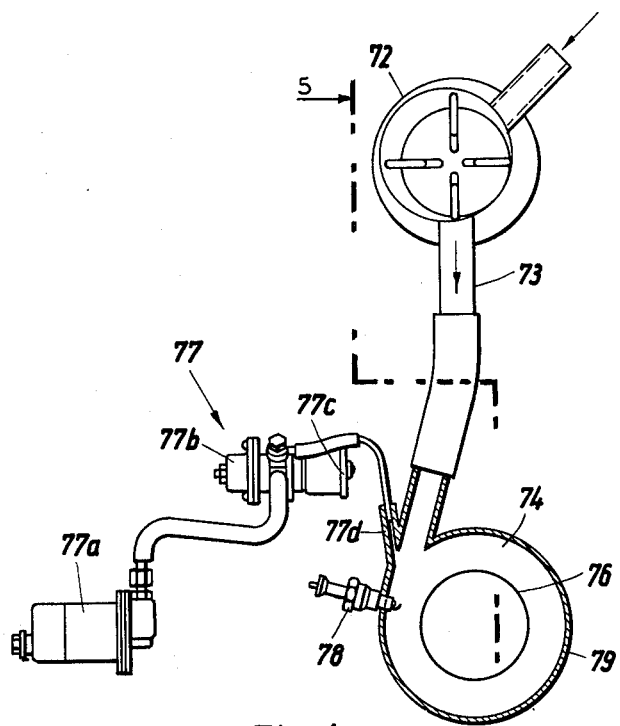
FIG. 4 is a schematic end elevation partly in section of another embodiment of a combination space heater and ventilator and exhaust gas decontaminator constructed in accordance with the invention and taken along line 4—4 of FIG. 5.

FIGS. 4 and 5 show another embodiment of the invention and show the heating and ventilating device which is driven by means of an electric motor 71. The motor 71 drives a blower 72 which is arranged to discharge combustion air through an air line 73 which connects to an annular suction space 74 which surrounds an exhaust pipe 76. The suction space 74 is defined at one end of an ejector 75 which surrounds the nozzle end of the exhaust pipe 76. Fuel is supplied by means of a fuel supply system 77 and includes a pump 77a, a regulator 77b and a valve 77c and is discharged tangentially by a nozzle 77d into the annular space 74. A spark plug 78 is arranged to ignite the fuel and air mixture and the products of combustion are directed through the ejector 75 into catalyst container 79 having a catalyst 80 disposed therein between the inlet for the exhaust gases and a discharge opening 140. The interruptor for the spark plugs is advantageously provided on the shaft of the electromotor 71.

In accordance with this aspect of the invention the catalyst 80 may be maintained at an operating temperature by the operation of a thermostatic supervising switch 81 which has a bulb element which senses the temperature in the catalyst chamber 79a and regulates the combustion device in accordance therewith. In this arrangement the combustion of the heating device which takes place in the ejector surrounding the exhaust pipe provides for a very intense open flame burning in the catalyst chamber. The catalyst container 79 is advantageously arranged as an element of the heat exchanger through which air for heating purposes may be circulated.

Figure 6:
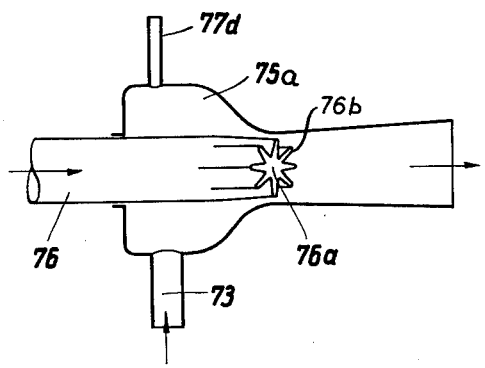
FIG. 6 is a view similar to FIG. 5 of another embodiment of the ejector.

In FIG. 6 there is indicated a slightly modified arrangement from that indicated in FIGS. 4 and 5 in which an ejector 75a is provided. The ejector 75a surrounds an exhaust gas pipe 76 which carries in the region of the discharge 76a with a special configuration of a star-shaped outline. The exhaust gas flow emanating from the exhaust line distributes itself throughout the star finger portions 76b and forms a very large surface with the secondary medium. In this manner a short path for after-combustion is made possible without making it necessary to build in screening elements in a flow path to increase the resistance to flow.

Figure 7:
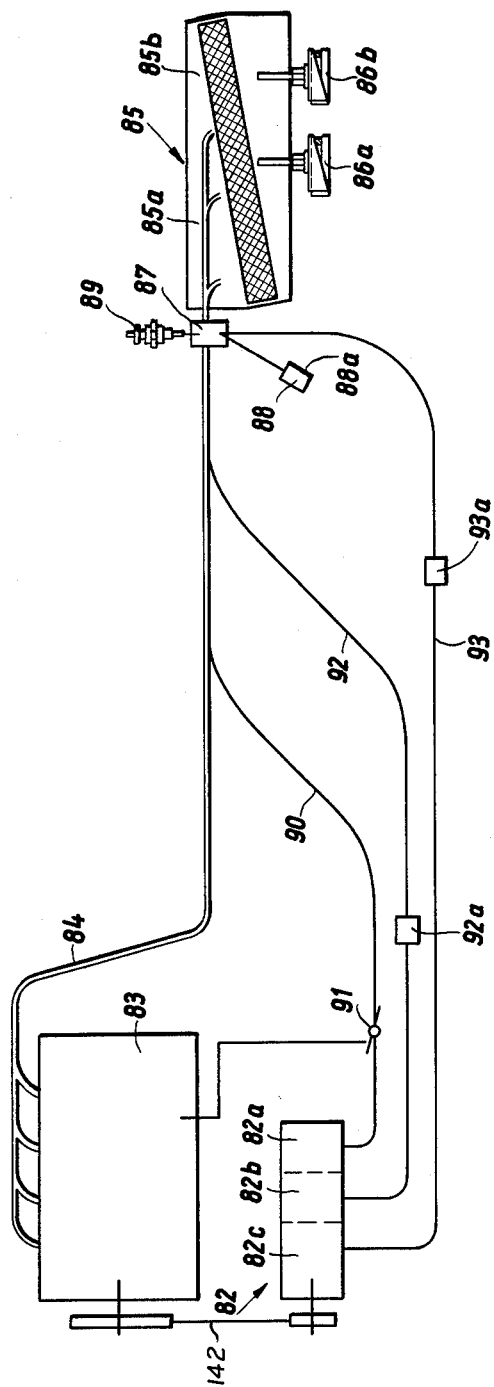
FIG. 7 is a schematic view of another embodiment of combination space heater and exhaust gas decontaminator system.

In FIG. 7 a further embodiment of the decontaminating device with a heat and cooling device is indicated but is employed with internal combustion engine 83. The internal combustion engine 83 is arranged to drive through belting gearing or suitable means a three stage air compressor generally designated 82 with stages 82a, 82b and 82c. The exhaust of the engine 83 leads to a collecting line 84 and is directed into a decontaminating chamber 85 over a catalyst 85b. The thermostats 86a and 86b are arranged in the catalyst chamber 85a to sense the operating maximum and minimum temperatures and to effect flow of cooling air, combustion air or oxygen supply air through one of three conduits 90, 92 and 93 which connect to compressor stages 82a, 82b and 82c, respectively. Conduit 90 extends from stage 82a directly into the exhaust line 84 as does conduit 92. Conduit 90 is provided with a solenoid control valve 91 and the conduit 92 with solenoid control valve 92a. Line 93 connects from the stage 82c to a combustion chamber 87 and flow of the air therefrom is regulated by the control valve 93a. Fuel is submitted through a fuel system 88 which includes a valve 88a into the combustion chamber 87 and an igniter 89 is operated in timed relationship to the engine.

The oxidation air supply for the decontaminator 85 is constantly taken from the part 82a of the compressor 83 through line 90 during operation. The control valve 91 provided in the line 90 cooperates with the acceleator of the combustion engine 83 in such a manner that the dosage of the oxidation air is proportional to the exhaust gas quantity.

A thermostatic switch 86a in the decontaminator regulates the lower temperature limit at which the catalyst 85 operates. When the temperature is below this value then the fuel supply is released near the valve 88a.

The fuel supply is released via the magnetic valve 88a while the combustion air supply is released via the magnetic valve 93a. The fuel air mixture formed in the annular burner 87 is then ignited by means of the spark plug 89 and the flame or the hot gases are blown into the chamber 85a over the catalyst 85b. If during operation the upper limit value which is controlled by the switch 86b is exceeded then the thermostat switch disconnects the exciter circuit of the magnetic valves 88a and 93a and connects the circuit of the magnetic valve 92b to the current supply while the exhaust line 84 is supplied with cooling air to the line 92 until the optimum value of temperature has been reached again.

While specific embodiments of the invention have been shown and described in detail to illustrate the application of the inventive principles, it will be understood that the invention may be embodied otherwise without departing from such principles.

Figure 8:
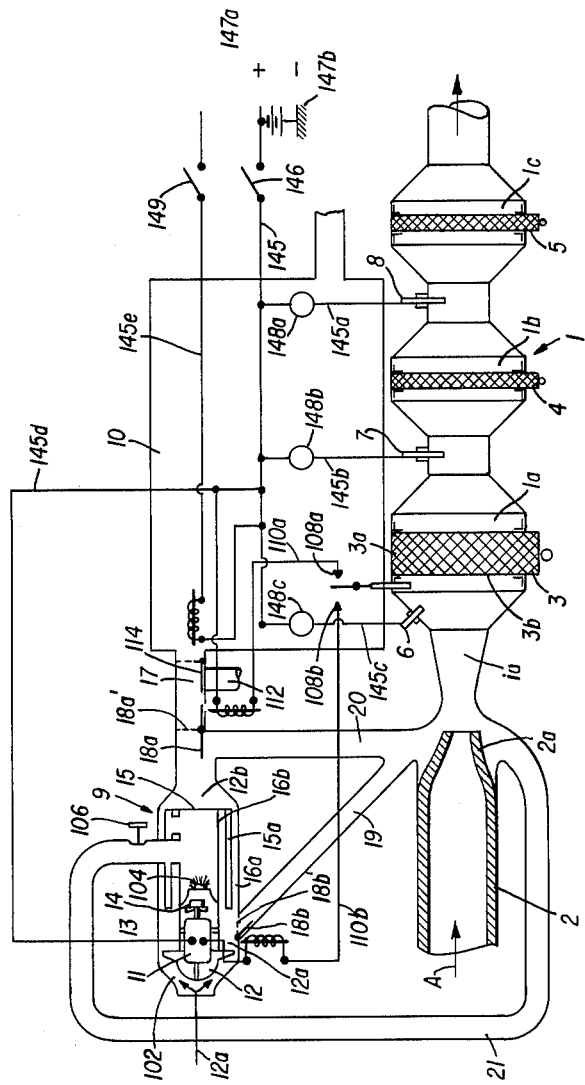
FIG. 8 is a switch arrangement as described in FIG. 1.

FIG. 8 shows a switch example. For supplying the current of the control arrangements, the conduit 145 as well as the switch 146 is connected with the positive element 147a of the battery 147. The negative element 147a is put on the instrument mass. Parallel in the circuit 145/147b the pilot lamps 148a, 148b and 148c, which when operating the toggle switches 6, 7 and 8 flash up, are switched in the conduits 145a, 145b and 145c. If the switch 146 is closed, the engine 11, which is connected over the conduit 146, is running simultaneously and puts the heating unit into operation. The flaps 18a and 18b will be switched through the thermostats in accordance with the position of the switch by the limit contacts 108a and 108b of the thermostat 108 in the circuit.

If the heating of the compartment space 10 is not desired, the circuit 145e/147b will be closed by the switch 149 and the flap 114, closing the conduit 17 and discharging the blower conduit line 112, put into operation.

What is claimed is:

1. A device for purifying unburned exhaust gases generated by an internal combustion engine and the like comprising an exhaust gas supply line, an ejector formed in the exhaust supply line including a converging nozzle section and a diverging discharge section arranged in coaxial alignment therewith, a catalyst conduit connected to the divergent section of said ejector and having a catalyst therein disposed thereacross to lie in the stream of gases passing therethrough, a heater having means for burning fuel and air for generating high temperature gases, first conduit means connecting said heater to said exhaust line between the converging and diverging sections of said nozzle at a location to effect sucking of said high temperature gases into the exhaust line by the passage of exhaust gases through said nozzle converging section into said nozzle diverging section, second conduit means for delivering air to said exhaust line, first and second valve means respectively controlling a flow of high temperature gases through said first conduit means and flow of air through said second conduit means; and temperature responsive means effective to sense the temperature adjacent said catalyst, and controlling operation of said first and second valve means to regulate the relative quantities of said high temperature gases and said air flowing to said exhaust line to maintain the temperature adjacent said catalyst at a value at least equal to the temperature at which said catalyst becomes active and less than a value at which the catalyst will be damaged.

2. A device according to claim 1, wherein said heater is arranged around an end of said exhaust line and said catalyst container, said heater including a driving turbine arranged in the exhaust stream and rotated thereby, a blower rotated by said driving turbine for directing circulating cooling and combustion air, fuel means disposed in the path of said combustion air for igniting and burning fuel therewith and for directing the gaseous products of combustion formed thereby to said ejector, and nozzle means between said catalysts and said turbine for introducing gaseous products of combustion generated by said heater into said exhaust flow stream.

3. A device according to claim 1, wherein said heater includes a first annular passage surrounding said exhaust gas line, means for directing space heating air through said first annular area, and a second annular passage around said first annular passage forming a combustion space, and means for generating and directing gaseous products of combustion into said second area.

4. A device according to claim 3, including coils connected to said combustion chamber and having a portion coated with a catalyst material disposed in said catalyst container for flow of exhaust gases thereover.

5. A device according to claim 1, wherein said heating means includes an ejector formed around the exhaust gas line tube including a tubular element surrounding said exhaust line, said exhaust line having converging walls at its end forming a nozzle discharge within said ejector, and means for directing gaseous products of combustion into said ejector around said exhaust pipe.

6. A device according to claim 5, wherein said exhaust pipe walls are formed in a star-shaped configuration at the end with radially extending finger portions for distributing exhaust gases over the area of the discharge opening.

7. A device according to claim 1, including a compressor, means on said compressor for connecting it for operation by the internal combustion engine, said compressor having three separate stages connected to said exhaust line, one of said stages furnishing combustion air to said heating means.

8. A combination heater and exhaust gas purifier for connection to an exhaust line of an internal combustion engine and the like comprising an ejector having a converging wall nozzle section and a diverging wall discharge section in alignment therewith, said ejector being connected to said exhaust line for the discharge of the exhaust gases through said convergent section and out said divergent nozzle section, a heater having wall means defining a combustion chamber, means in the vicinity of said combustion chamber for directing heating air flow therearound and also for directing combustion air into said combustion chamber for supporting combustion including a heating air conduit, means for directing fuel into said combustion chamber and for burning fuel with the combustion air to produce gaseous products of combustion therein, a first conduit connected between said combustion chamber and said ejector and connecting into said ejector adjacent the converging wall nozzle section, a second conduit connected to said means for directing air flow around and into said combustion chamber and connected to said ejector at a location adjacent the converging wall nozzle section for the circulation of air and combustion air to said ejector, a catalyst of a substance to cause further burning of said exhaust gases disposed in the flow path of said exhaust gases discharging from said divergent nozzle section, means to sense the temperature adjacent said catalyst and connected to said first and second conduits and said heater to regulate the relative proportions of air and gaseous products of combustion to said ejector for maintaining the temperature of said exhaust gases, in the vicinity of said catalyst, at a value at least equal to the temperature at which said catalyst becomes active and less than the temperature at which said catalyst will be damaged.

9. A combination heater and exhaust gas purifier for connection to an exhaust line of an internal combustion engine and the like comprising an ejector having a converging nozzle section, a throat section, and a diverging discharge nozzle section connected in said exhaust line for the discharge of the exhaust gases therethrough, a heater having wall means defining a combustion chamber and wall means defining a heating air flow space around said combustion chamber, means for directing combustion air into said combustion chamber for supporting combustion, means for directing fuel into said combustion chamber and for burning fuel with the combustion air to produce gaseous products of combustion therein, a first conduit connected between said combustion chamber and said ejector and connecting into said ejector adjacent the converging wall nozzle section, second conduit means connected to said heating air flow space and said ejector adjacent the converging wall nozzle section for the circulation of air to said ejector, a catalyst for oxidizing said exhaust gases disposed in the flow path of said exhaust gases discharging from said divergent nozzle and means to sense the temperature in the vicinity of said catalyst and connected to said first and second conduits and said heater to control the relative proportions of air and of gaseous products of combustion to said ejector to maintain the temperature of said exhaust gases, in the vicinity of said catalyst, at a value at least equal to the temperature at which said catalyst becomes active but less than a temperature at which said catalyst will be damaged.

10. A combintion space heater and ventilator and gas purifying device comprising an ejector connected to an exhaust line comprising a converging passage through which exhaust gases are directed and a divergent nozzle portion to which the gases are discharged, a heater including a casing surrounding said ejector, a catalyst disposed in said casing in the path of flow gas arranged in the discharge of the divergent nozzle to permit the exhaust gases to flow therethrough, a wall, an annular passage defined around said heater, a second ejector located in said casing to receive flow from said exhaust gases and to discharge them radially, a turbine arranged at the discharge of said second ejector and rotated by said exhaust gases, the gases passing through said annular chamber for discharge at one end thereof, blower means operated by said turbine arranged to direct air around said annular chamber, and a heater including a casing connected to said blower means to receive air therefrom, a heater combustion chamber including wall means defined in the flow path of the air passing from said blower and means for introducing, atomizing, and burning fuel in said combustion chamber means, conduit means connecting said combustion chamber to said first ejector, means permitting circulation of air from said blower to said first ejector, and control means for controlling the air circulated by said blower and heating air from said combustion chamber to said first ejector, including temperature responsive means located adjacent said catalyst, to control the relative proportions of said heating air and said air circulated by said flow blower delivered to said first ejector to maintain the temperature of the exhaust gases adjacent the catalyst at a value at least equal to the temperatue at which said catalyst becomes active but less than the temperature at which said catalyst will be damaged.

References Cited by the Examiner

UNITED STATES PATENTS

| | | |
|---|---|---|
| 1,272,485 | 7/1918 | McMahon. |
| 1,875,024 | 8/1932 | Kryzanowski. |
| 1,877,523 | 9/1932 | Gordon. |
| 1,985,713 | 12/1934 | Bartlett. |
| 2,776,875 | 1/1957 | Houdry. |
| 2,777,759 | 1/1957 | Sokolik. |
| 2,807,930 | 10/1957 | Bratton. |
| 2,880,079 | 3/1959 | Cornelius. |
| 2,898,201 | 8/1959 | Hayes. |
| 2,898,202 | 8/1959 | Houdry et al. |
| 2,937,490 | 5/1960 | Calvert. |
| 2,946,651 | 7/1960 | Houdry. |
| 2,991,160 | 7/1961 | Claussen. |
| 3,050,935 | 8/1962 | Eastwood. |

FOREIGN PATENTS

| | | |
|---|---|---|
| 675,355 | 5/1939 | Germany. |

MORRIS O. WOLK, *Primary Examiner.*

GEORGE D. MITCHELL, *Examiner.*